United States Patent [19]
Gensel et al.

[11] Patent Number: 5,932,042
[45] Date of Patent: Aug. 3, 1999

[54] COMPACT DISC CURING ASSEMBLY LINE WITH DEFORMING TO A PREDETERMINED CURVATURE PRIOR TO COMPLETE CURE

[76] Inventors: Lewis Gensel, 837 Mill St., Avoca, Pa. 18641; Edward Misewicz, 105 Sunset Dr., Archbald, Pa. 18403; William Mueller, 2007 Terra Dr., Clarks Summit, Pa. 18411; Edward Pickutoski, 606 Sanderson Ave., Olyphant, Pa. 18447; Peter Van Hoof, 416 Spruce St., Moosic, Pa. 18507

[21] Appl. No.: 08/878,703

[22] Filed: Jun. 19, 1997

[51] Int. Cl.⁶ .............................. G11B 7/26; B32B 31/00
[52] U.S. Cl. .............................. 156/74; 118/52; 156/295; 369/286; 427/240
[58] Field of Search .............................. 156/74, 295, 578; 427/240; 118/52; 369/286

[56] References Cited

U.S. PATENT DOCUMENTS

| | | | |
|---|---|---|---|
| 4,877,475 | 10/1989 | Uchida et al. | 427/240 X |
| 5,284,538 | 2/1994 | Suzuki et al. | 369/286 X |
| 5,378,517 | 1/1995 | Suzuki et al. | 369/286 X |
| 5,744,193 | 4/1998 | Kitano | 156/74 X |
| 5,800,670 | 9/1998 | Kitano | 156/74 X |

*Primary Examiner*—Jeff H. Aftergut
*Attorney, Agent, or Firm*—Gottlieb Rackman & Reisman, P.C.

[57] ABSTRACT

Automatic process control of the optical disc bonding process is achieved by tacking the adhesive and deforming the composite prior to final bonding. A separator chuck is used to maintain the separation of the disc halves through tack curing and a disc deforming jig is used during final bonding to compensate for any tendency of the disc halves to deform during the bonding operation.

6 Claims, 5 Drawing Sheets

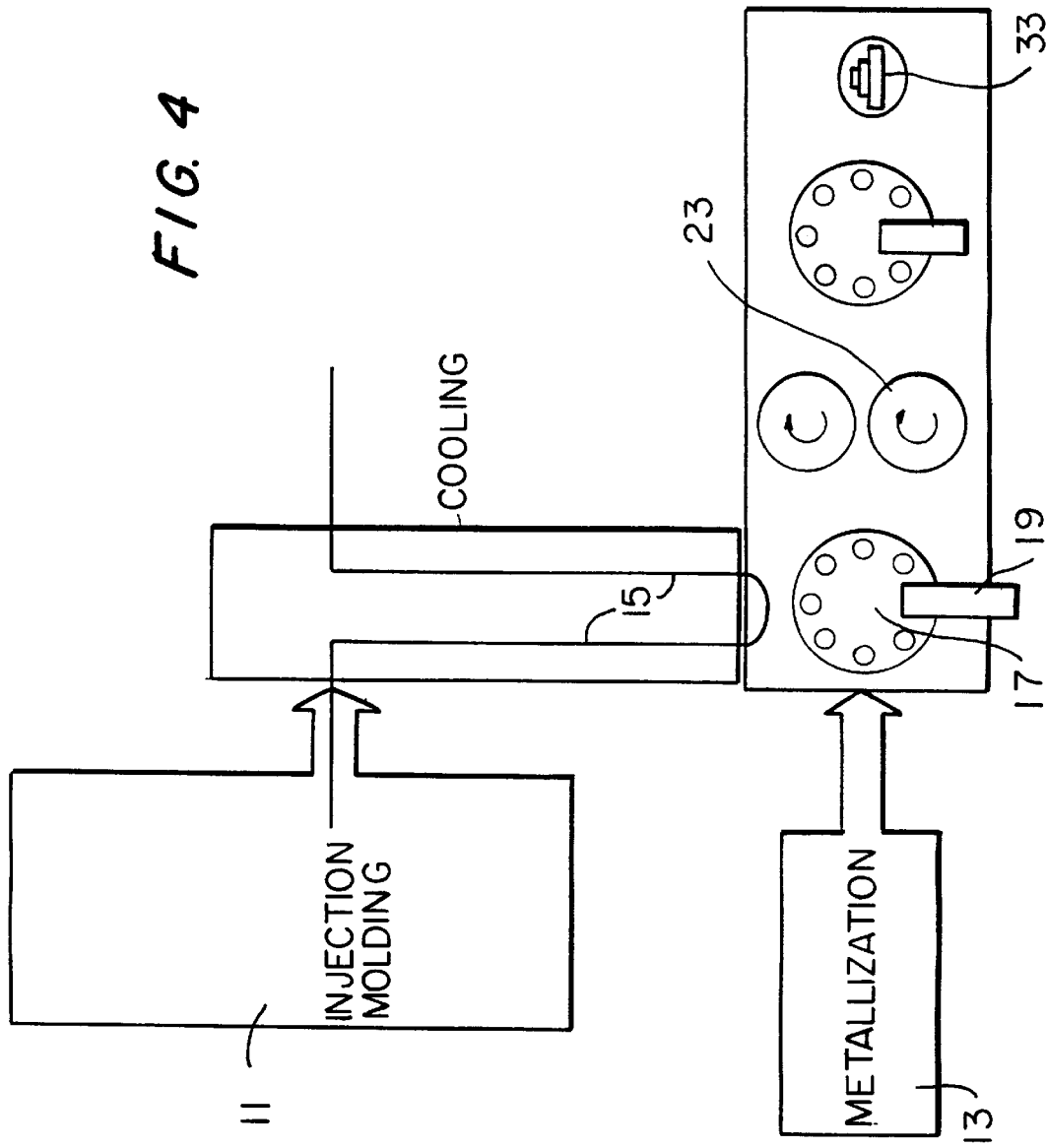

COMPACT DISC CURING ASSEMBLY LINE WITH DEFORMING TO A PREDETERMINED CURVATURE PRIOR TO COMPLETE CURE

FIELD OF THE INVENTION

This invention relates to the manufacture of compact optical data discs for the storage of information in the form of a high density of pits in a flat plastic disc shaped surface. In particular it relates to the manufacture of such discs by the formation of a composite of two surfaces bonded to each other during the disc manufacturing process. Still further it relates to apparatus for use in a disc manufacturing assembly line to assure that the resulting composite is planar after the completion of the bonding process.

BACKGROUND OF THE INVENTION

Plastic discs having a pit optical track structure are known as compact discs. Double sided discs in which information is recorded on two sides of such a structure formed by binding two compact discs and apparatus for playing such discs is also known, as in U.S. Pat. Nos. 4,903,140; 4,939,011; 5,097,465; 4,811,324. In forming such disks it is also taught in U.S. Pat. No. 5,284,538 and 5,378,517 that it is advantageous to bring the two disc portions together at an angle in order to facilitate bonding.

The term compact disc as used in this application includes any disc shaped recorded medium having pits and lands forming an optical track structure on a data information recording planar surface. Thus it includes such discs where the information stored as pits and lands is digital information, analog information, or information of a graphic or holographic nature. Examples of the different types of information storage are as follows: Digital information may be encoded into the pits and lands as pits of quantized lengths interpretable as a stream of digital data, wherein the length of each pit or land segment may be, for example, related to the number of 1's or 0's in a data stream. An example of such a system is the compact disc ("CD") audio or video disc. Analog information may be encoded into the pits and lands as pit lengths that may vary over a continuum of values, wherein the length of each pit or land segment may be, for example, related to a voltage level in a desired output. An example of such an analog system is the laser disc video recording system. Graphics may be placed on the surface of a disc by employing the light reflection properties of pitted surfaces that are visible to the unaided eye. Similarly holographic information may be stored in a pit/land format, particularly where it is possible to vary the pit depth to create reflection interference patterns that are visible as a holographic image viewable by the unaided eye.

In order to increase the density of information stored on compact discs it is known to manufacture a sandwich of two thin data bearing surfaces that are bonded together. It is necessary to use thin surfaces in order to minimize the coma associated with the passage of light through the plastic material to reach the data pits. It is also known to bond one thin data surface to a thin supporting surface. The two surfaces are bonded together, typically with the use of ultra-violet curable adhesives. The injection molding process and the ultra-violet bonding process tend to introduce distortions from planarity of the surface of the resulting compact disc, primarily because of the heat introduced by those processes. Thus when played the surfaces do not remain a fixed distance from the reading laser. Since the laser light is neither perfectly columnar nor uniform in intensity, the result is inconsistency in the reading of the data from the disc. This problem defeats the use of the conventional assembly line for the manufacture of compact discs. The conventional assembly lines did not face the aforesaid problems because the greater thickness of the plastic surface of the compact disc provided greater stability against deformation.

The use of two surfaces bonded by an adhesive enhances distortions in the surface. This is particularly true when one of the two thin discs has recently emerged at relatively elevated temperature from an injection molding machine while the second disc to be part of the "sandwich" is cooler. In the prior art practiced by such machines as those produced by Origin and Kitano, a uniform spread of the adhesive is obtained by laying down a circular bead of adhesive near the central hole of a first disc surface, bringing the second surface above the first until it contacts the bead of adhesive and then rapidly rotating the combination. Centrifugal force then spreads the adhesive uniformly between the two surfaces. This sandwich is then uniformly illuminated by ultra-violet radiation to cure the adhesive. The result is generally unsatisfactory as the surface is subject to deformation from planarity at each stage. It has been discovered by the present inventor that one cause of this deformity is that the rotation of the surfaces while they contact the adhesive tends to draw the outer circumference of the discs together. One aspect of the invention is designed to compensate for this defect in the prior art.

BRIEF DESCRIPTION OF THE INVENTION

The present invention relates to two layer compact disc information retrieval systems having a pit optical track structure. In particular the invention relates to a method and apparatus for bonding together two compact half discs or one half disc and a support or fill in half disc to form a double layered disc in an assembly line manufacturing system.

The invention is specifically concerned with the manufacture of 0.6 mm thick optical discs produced by an injection molding machine for lamination to either blank or information side similar discs. Injection molding methods and apparatus are known in the art. Injection molding can be generally described as a replication process in which a molten material (usually a polymer) is injected into a cavity and after cooling forms the geometry of the cavity.

The present invention involves a combination of improvements of the assembly line process for the manufacture of compact discs. It involves improvements in several stations. The present invention is an in-line system for fabricating a double layered compact disc by bonding together two surfaces, at least one of which is information bearing, separately referred to as half discs. The system comprises stages for the injection molding of the disc surfaces and their metallization, an adhesive dispensing and distributing station including a unique spacer chuck, a preliminary tacking station, and a final bonding station comprising a unique disc deforming jig.

The spacer chuck is used to maintain a separation between the two half disc surfaces subsequent to the application of an ultra-violet light curable adhesive to one surface and prior to its spreading across the disc surface. This separation chuck engages the discs at their central openings. It has a detent past which the lower disc half is pushed, while the upper disc half is placed on the chuck to lie against the upper surface of the detent. The chuck enables a rapid and careful timing of the series of steps in which the adhesive is contacted by the second surface, spread, and tack cured. The assemblage of discs at all stations is positioned by robotic mechanisms.

Tack curing is achieved by a low intensity exposure to ultra-violet light that exposes primarily the non-data portions of the disc, i.e. the inner and outer radii that extend beyond the metallization region. This tack curing is a feature of the invention that allows the movement of the composite to the final curing station where the surfaces are subjected to intense heat that could tend to deform the surfaces unequally. At the final bonding station a unique disc deforming jig holds the disc in a particular curved configuration so that it forms a flat surface after cooling from the bonding station temperature. By tacking down the radii as described and using the disc deforming jig, motion of the disc surfaces and the attendant distortion is avoided.

BRIEF DESCRIPTION OF THE DRAWINGS

FIG. 2A shows the jig arrangement for a flat disc, FIG. 2B shows the jig arrangement for a disc with positive tilt; FIG. 2C shows the jig arrangement for a disc with negative tilt.

FIG. 4 depicts the in-line system of the present invention for producing two layer compact discs.

DETAILED DESCRIPTION OF PREFERRED EMBODIMENTS

Figure 6:
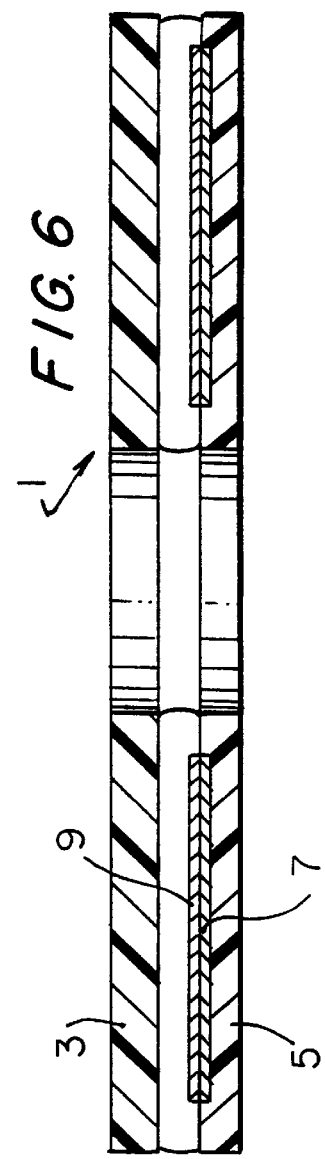
FIG. 6 depicts a cross section of a double sided compact disc produced by the present invention.

A preferred embodiment of the present invention may be best described in connection with the figures. FIG. 6 depicts a cross section of a portion of double surfaced compact disc 1 formed from an upper half surface 3 and a lower information bearing half surface 5. The surface 3 may be, but need not be, information bearing. Each half bearing surface is formed by injection molding a polycarbonate plastic surface having a pattern of pits and lands 7 and coating the pits and lands with a metallic reflective coating 9. The in-line system is shown in FIG. 4, in which an injection molding station 11 injects a molten transparent polycarbonate plastic into a mold cavity, having a stamper on one face to produce a clear plastic disc 5 with pits 7 impressed on one side. The molded plastic disc is place in a carousel 17 which rotates to bring it to the metallization station 13 where it is lifted by a robotic arm brought into the metallization station, coated upon its pitted surface with a reflective metal layer 9 and returned to the carousel. Where the surface is not information bearing it would not require a metallization step.

Figure 3:
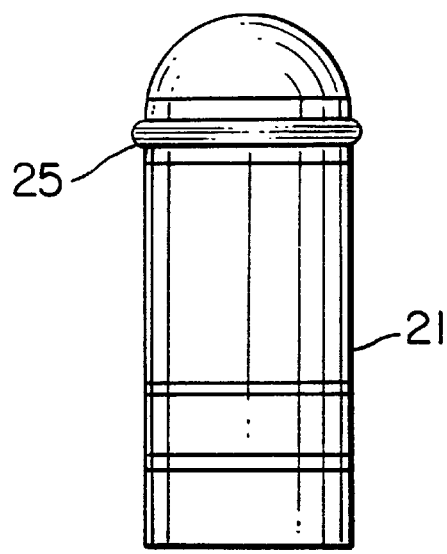
FIG. 3 is a side view of the spacer chuck of the present invention.

In one embodiment the half disc 5 travels upon disc transport belts 15 during which time it cools somewhat. The corresponding upper disc half 3 waits upon a spindle for assembly. At each station of the carousel a spacer chuck as shown in FIG. 3 is present. When the disc half is returned from metallization by a robotic arm it is forced down from above onto the spacer chuck past the detent element 25.

Figure 5:
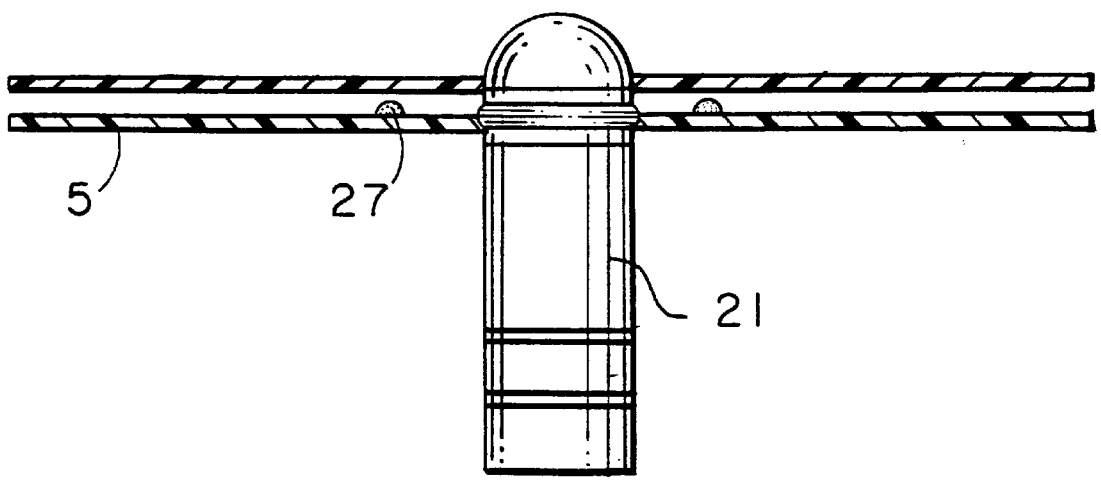
FIG. 5 shows a cross section of the arrangement of half discs and adhesive prior to adhesive spreading.
Figure 7:
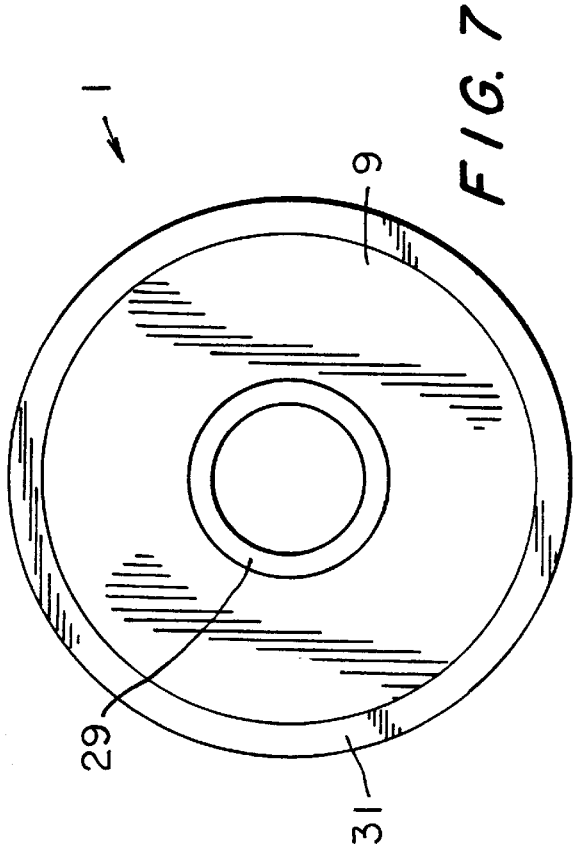
FIG. 7 depicts a top view of the compact disc of the present invention.

As depicted in FIG. 5, the lower disc half is moved by a robotic arm to a rotation station 23. At station 23 the lower disc half is placed upon a spacer chuck 21 shown in detail in FIG. 3. A fluid dispensing arm 19 places a ring of an ultra-violet curable adhesive as the lower half disc as it is slowly rotated through a full rotation on the spacer chuck. The detent has a lesser height than the layer of adhesive 27 placed at an inner radius of the lower half disc. A robotic arm then removes the upper half disc from the spindle 20 and places it upon the spacer chuck as shown in FIG. 5, so that it does not contact the adhesive 27. Then within about a two second interval the pair of discs is lifted by a robotic arm that reaches into the space between the spacer chuck and the central hole in the two disc surfaces to lift the disc while maintaining the separation established by the detent in the spacer chuck. The space between the chuck and the central hole is accessible because the detent does not extend around the entire circumference of the spacer chuck. The combination is lifted to one of two spin stations 24 where the upper surface comes into contact with the adhesive and the sandwich of discs and adhesive is rapidly spun to spread the adhesive to form the thin layer 4 shown in FIG. 6. (Note that the dimensions shown in FIG. 6 are not to scale.) The composite is then lifted to a second carousel 18 where it is tack cured by exposing the composite to ultra-violet light of low intensity adjusted so that primarily the inner and outer circumferences of the disc halves are bonded. This may be simply accomplished because the compact disc, as shown in FIG. 7, has a metallization layer that does not extend to either the internal or external radii of the disc. Since the metallization of the disc has been accomplished prior to this exposure, it is sufficient to bathe the entire disc in ultra-violet radiation and rely upon the shielding by the metallization layer to effect the tacking of the surfaces together at their inner and outer circumferences. Tack curing is effectively limited to the inner and outer regions 29 and 31.

Figure 1:
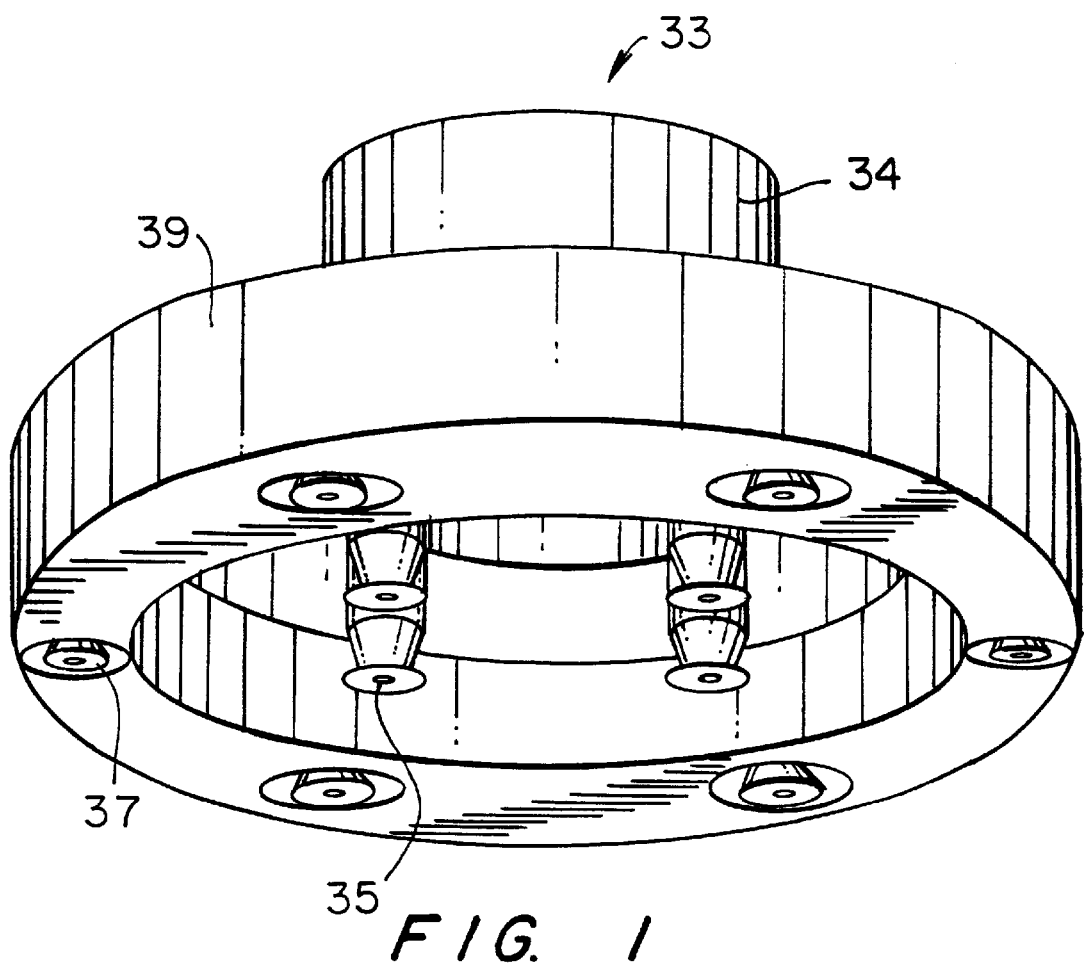
FIG. 1 shows in perspective the disc deforming jig of the present invention.

The disc composite is then engaged by the disc deforming jig 33 shown in FIG. 1. The jig has an inner ring of suction feet 35 and outer ring of suction feet 37 that hold the disc at inner and outer radii. The rings of suction feet are moveable with respect to each other by raising the central potion 35 to which the inner suction feet are attached, with respect to the outer ring 39. The adjustment is made by a screw mechanism engaged by the knob 37 seen for example in FIG. 2A. The adjustment results in a raising and lowering of the suction cup feet that bear against the disc surface. A vacuum is present through channels leading to the feet to engage the disc and to force it firmly against the suction cup feet so that the adjustment in position effects the deformation of the disc resulting in planarity.

Figure 2A:
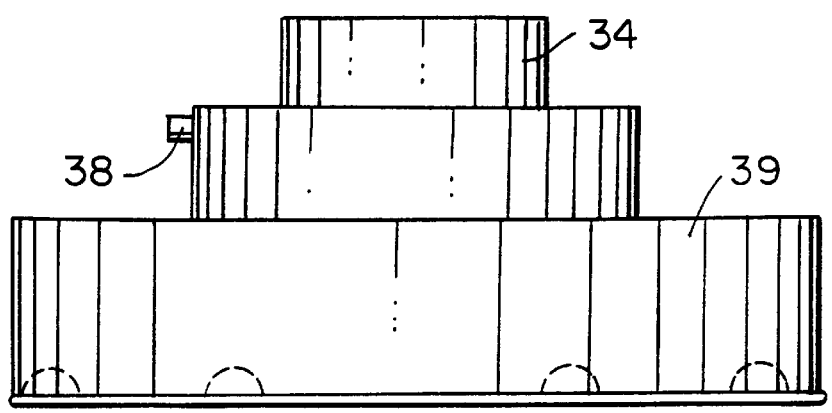
FIGS. 2A–C are side views of the disc deforming jig of the present invention.
Figure 2B:
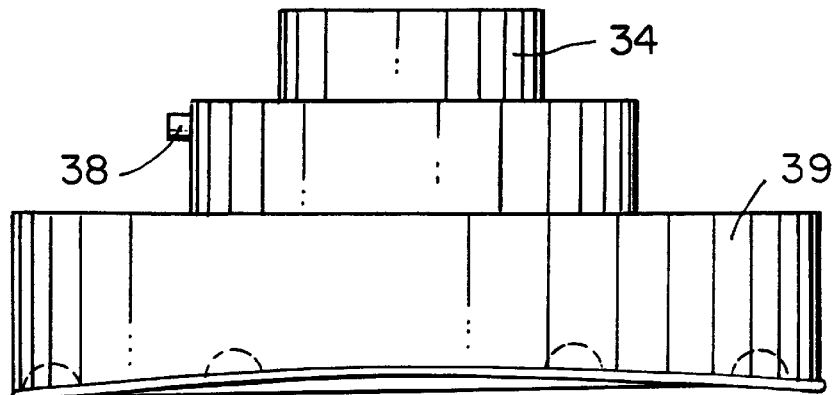
Figure 2C:
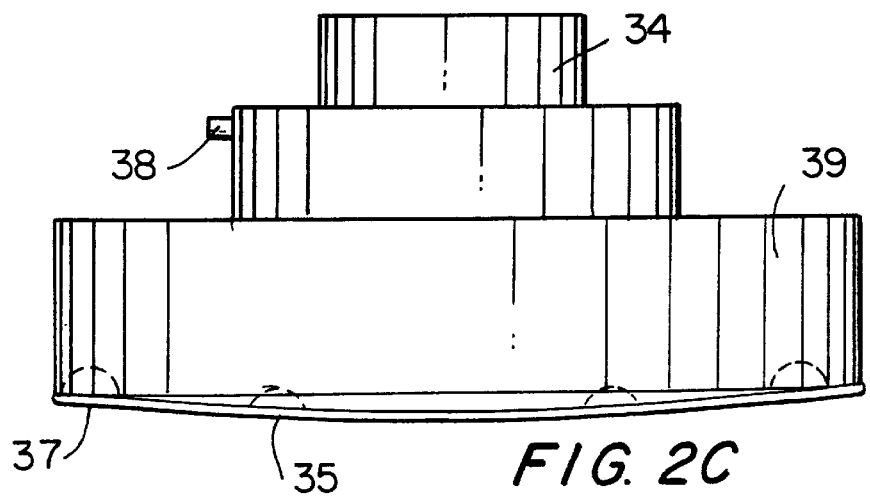

As shown in FIG. 2A–2C, the disc deforming jig 33 holds the disc flat as in FIG. 2A or deformed either positively as in FIG. 2B or negatively as in FIG. 2C during the final curing stage occurring at curing station 41. As depicted in FIGS. 2A–C the jig is adjusted to compensate for any overall non-planarity that the preceding process steps were unable to eliminate. The jig is not adjusted on a disc by disc basis, but is adjusted to compensate for the average tilt resulting from the operation of the assembly line. While engaged by the jig the composite is exposed to sufficient ultra-violet light to cure the adhesive. Although this requires the ultra-violet light to pass through the metallic layer, that is accomplished by using a high intensity ultra-violet source. In this manner a flat composite is formed even though substantial heating of the composite may occur.

Although the invention has been described in terms of specific embodiments, it is intended that the patent cover equivalent substitutions for any of the elements of these embodiments, and that the protection afforded by this patent be determined by the legitimate scope of the following claims:

What is claimed is:

1. A method for controlling the planarity of a compact disc formed by bonding two half disc surfaces, comprising (a) preparing the half disc surfaces by injection molding and metallization of at least one half surface,
   (b) placing a ring of adhesive on an inner radius of one of the disc halves,
   (c) locating both disc halves on a spacer chuck so that the discs halves are separated,
   (d) removing the disc halves from the spacer chuck to a station where the disc halves may both contact the adhesive,
   (e) spinning the disc halves to spread the adhesive to form a layer between the said disc halves,
   (f) tack curing the adhesive to form a composite disc,
   (g) adjusting a deforming jig to a predetermined curvature,
   (h) engaging the composite disc with the said jig adjusted to deform the composite to said predetermined curvature,
   (i) further curing the adhesive.

2. The method of claim 1 wherein said placement of adhesive occurs after one of the disc halves is located on the spacer chuck.

3. The method of claim 1 wherein said location of disc halves leaves both disc halves in contact with said adhesive.

4. The method of claim 1 wherein said tack curing provides some adhesive bonding throughout the adhesive layer.

5. The method of claim 1 wherein said adjusting the deforming jig to a predetermined curvature comprises the step of moving an inner disc retainer with regard to an outer disc retainer.

6. The method of claim 5 wherein said inner and outer disc retainers are rings of suction feet adapted to hold a surface of the disc composite.

* * * * *